(12) United States Patent
Lam

(10) Patent No.: US 9,639,550 B2
(45) Date of Patent: May 2, 2017

(54) DATA DEDUPLICATION

(75) Inventor: Wayne Lam, Muttontown, NY (US)

(73) Assignee: FalconStor, Inc., Melville, NY (US)

( * ) Notice: Subject to any disclaimer, the term of this patent is extended or adjusted under 35 U.S.C. 154(b) by 0 days.

(21) Appl. No.: 13/199,454

(22) Filed: Aug. 31, 2011

(65) Prior Publication Data
US 2012/0089578 A1    Apr. 12, 2012

Related U.S. Application Data

(60) Provisional application No. 61/402,535, filed on Aug. 31, 2010.

(51) Int. Cl.
*G06F 17/30* (2006.01)
(52) U.S. Cl.
CPC ............................. *G06F 17/30159* (2013.01)
(58) Field of Classification Search
USPC ........................................................ 707/692
See application file for complete search history.

(56) References Cited

U.S. PATENT DOCUMENTS

| | | | |
|---|---|---|---|
| 6,513,051 B1 * | 1/2003 | Bolosky et al. | |
| 7,055,008 B2 | 5/2006 | Niles et al. | |
| 7,092,956 B2 | 8/2006 | Ruediger | |
| 7,603,529 B1 | 10/2009 | MacHardy et al. | |
| 7,610,285 B1 | 10/2009 | Zoellner et al. | |
| 7,765,160 B2 | 7/2010 | Niles et al. | |
| 7,865,873 B1 | 1/2011 | Zoellner et al. | |
| 7,954,157 B2 | 5/2011 | Niles et al. | |
| 7,962,499 B2 | 6/2011 | Lam | |
| 8,214,376 B1 * | 7/2012 | Jordan | G06F 17/30336 707/755 |
| 2005/0108486 A1 | 5/2005 | Sandorfi | |
| 2006/0218638 A1 | 9/2006 | Niles et al. | |
| 2007/0198659 A1 | 8/2007 | Lam | |
| 2009/0063795 A1 * | 3/2009 | Yueh | 711/162 |

(Continued)

OTHER PUBLICATIONS

Single Instance Storage in Microsoft Windows Storage Server 2003 R2, A Solution for Managing Duplicate Files, May 2006.*

(Continued)

*Primary Examiner* — Robert Beausoliel, Jr.
*Assistant Examiner* — Hau H Hoang
(74) *Attorney, Agent, or Firm* — Cozen O'Connor; Brandon N. Sklar

(57) ABSTRACT

A method of deduplicating data is disclosed comprising mounting, by a deduplication appliance, network shared storage of a client machine, via a network, accessing data to be deduplicated on the network shared storage device, deduplicating the data, storing the deduplicated data on a second storage device, and replacing the data in the network shared storage device by at least one indicator of the location of the deduplicated data in the second storage device. A method is also disclosed for copying deduplicated data stored by a deduplication appliance, by a client machine, comprising receiving a request to copy data from a first location to a second location, by the client machine, by providing at least one second indicator to the third location on the deduplication appliance, at the second location, if the source and the destination are on the deduplication appliance. Systems are also disclosed.

33 Claims, 9 Drawing Sheets

(56) References Cited

U.S. PATENT DOCUMENTS

| | | | |
|---|---|---|---|
| 2009/0132619 A1 | 5/2009 | Arakawa et al. | |
| 2009/0182789 A1 | 7/2009 | Sandorfi et al. | |
| 2009/0319585 A1* | 12/2009 | Gokhale | 707/205 |
| 2010/0064166 A1 | 3/2010 | Dubnicki et al. | |
| 2010/0070725 A1 | 3/2010 | Prahlad et al. | |
| 2010/0274763 A1 | 10/2010 | Ingen et al. | |
| 2011/0093439 A1* | 4/2011 | Guo | G06F 11/1453 707/679 |
| 2011/0138154 A1* | 6/2011 | Tevis et al. | 712/220 |
| 2011/0231367 A1 | 9/2011 | Niles et al. | |
| 2011/0246430 A1* | 10/2011 | Prahlad et al. | 707/679 |
| 2013/0238850 A1 | 9/2013 | Lam | |

OTHER PUBLICATIONS

OpenDedup, administration guide, http://web.archive.org/web/20100331180805/http://www.opendedup.org/ index.php/administrators-guide, Mar. 31, 2010.*

Linux Samba Server Administration by Roderick W. Smith, http://techedu.cu.cc/linux/Sybex%20Linux%20Samba%20Server%20Administration%20(2001).pdf, Sybex, 2001.*

Written Opinion of the International Searching Authority from PCT/US11/01509 dated Jan. 17, 2012.

PCT International Search Report from PCT/US11/01509 dated Jan. 17, 2012.

File-interface Deduplication System (FDS) 100 Series Storage Appliances. Data deduplication eliminates tape at remote and branch offices. FalconStor® 2011. Available at http://www.falconstor.com/dmdocuments/FDS-100Series_SS.pdf.

File-interface Deduplication System (FDS) High-performance network-attached data deduplication. FalconStor® 2011. Available at www.falconstor.com/dmdocuments/FDS_Overview.pdf.

A White Paper. Demystifying Data Deduplication: Choosing the Best Solution, FalconStor® 2009. Available at http://www.falconstor.com/library/documents/white-papers.

A White Paper. How Data Deduplication Works. FalconStor® 2010. Available at http://www.falconstor.com/library/documents/white-papers.

Office Action dated May 28, 2015 which issued in the corresponding Taiwanese Patent Application No. 100131092.

* cited by examiner

DATA DEDUPLICATION

RELATED APPLICATION

The present application claims the priority of U.S. Provisional Patent Application No. 61/402,535, which was filed on Aug. 31, 2010, is assigned to the assignee of the present application, and is incorporated by reference herein.

BACKGROUND OF THE INVENTION

Data deduplication reduces storage requirements of a system by removing redundant data, while preserving the appearance and the presentation of the original data. For example, two or more identical copies of the same document may appear in storage in a computer and may be identified by unrelated names. Normally, storage is required for each document. Through data deduplication, the redundant data in storage is identified and removed, freeing storage space for other data. Where multiple copies of the same data are stored, the reduction of used storage may become significant. Portions of documents or files that are identical to portions of other documents or files may also be deduplicated, resulting in additional storage reduction.

To implement data deduplication, in one example, data blocks are hashed, resulting in hash values that are smaller than the original blocks of data and that uniquely represent the respective data blocks. A 20 byte SHA-1 hash or MD5 hash may be used, for example. Blocks with the same hash value are identified and only one copy of that data block is stored. Pointers to all the locations of the blocks with the same data are stored in a table, in association with the hash value of the blocks.

A remote deduplication appliance may be provided to perform deduplication of other machines, such as client machines, storing data to be deduplicated. The deduplication appliance may provide a standard network file interface, such as Network File System ("NSF") or Common Internet File System ("CIFS"), to the other machines. Data input to the appliance by the machines is analyzed for data block redundancy. Storage space on or associated with the deduplication appliance is then allocated by the deduplication appliance to only the unique data blocks that are not already stored on or by the appliance. Redundant data blocks (those having a hash value, for example, that is the same as a data block that is already stored) are discarded. A pointer may be provided in a stub file to associate the stored data block with the location or locations of the discarded data block or blocks. No deduplication takes place until a client sends data to be deduplicated.

This process can be dynamic, where the process is conducted while the data is arriving at the deduplication appliance, or delayed, where the arriving data is temporarily stored and then analyzed by the deduplication appliance. In either case, the data set must be transmitted by the client machine storing the data to be deduplicated to the deduplication appliance before the redundancy can be removed. The deduplication process is transparent to the client machines that are putting the data into the storage system. The users of the client machines do not, therefore, require special or specific knowledge of the working of the deduplication appliance. The client machine may mount network shared storage ("network share") of the deduplication appliance to transmit the data. Data is transmitted to the deduplication appliance via the NFS, CIFS, or other protocol providing the transport and interface.

When a user on a client machine accesses a document or other data from the client machine the data will be looked up in the deduplication appliance according to index information, and returned to the user transparently, via NSF or CIFS, or other network protocols. If a user decides to copy a document from a first location to a second location, for data management operations, for example, the entire data set must be retrieved from the deduplication appliance and sent back to the client machine. If the destination location happens to be the deduplicated appliance, the copy of the data in the second location will be deduplicated again, as new data to be backed up. This is cumbersome, and may require use of a lot of network bandwidth and CPU usage in the client and the deduplication appliance.

SUMMARY OF THE INVENTION

In accordance with a first embodiment of the invention, methods and systems are provided for proactively accessing data stored locally on a client computer over a network by a deduplication appliance for deduplication and storage without the need for the client to send the data to the deduplication appliance, thereby reducing the complexity of implementation and management of the deduplication appliance. In one example, a deduplication appliance mounts the one or more local storage devices of a client computer that are designated as network shared storage devices accessible to the deduplication appliance over a network, accesses data from the local storage devices, deduplicates the data, and stores unique data in storage controlled by the deduplication appliance. The deduplication appliance may initiate the access and deduplication of files from a network share on a client system, in accordance with rules, such as a deduplication schedule, established by the client machines. All the data to be deduplicated does not, therefore, have to be moved across the network to the deduplication appliance, saving network bandwidth. The deduplication appliance replaces the data on the client with indicators, such as pointers or symbolic links, to the corresponding stored data in the storage of the deduplication appliance, changing the file to a stub file. The file containing the data can also be replaced by one or more stub files containing the indicators. The client may access the deduplicated data files by transparently accessing the location of the data on the deduplication appliance indicated by the stub file, thereby reducing storage requirements of the client.

In one example of the first embodiment, a method of deduplicating data is disclosed comprising mounting, by a deduplication appliance, network shared storage of a client machine, via a network, accessing data to be deduplicated on the network shared storage device, by the deduplication appliance, deduplicating the data, by the deduplication appliance, storing the deduplicated data on a second storage device by the deduplication appliance, and replacing the data in the network shared storage device by at least one indicator of the location of the deduplicated data in the second storage device. The data may be in a data file and the data file may be replaced by at least one stub file containing the at least one indicator. The first storage device may be mounted in accordance with at least one rule established by the client machine. The indicator may comprise a pointer.

In another example of the first embodiment, a system for deduplicating data is disclosed, comprising a first storage device and a deduplication appliance comprising a processor. The processor is configured to mount network shared storage of a client machine, via a network, access data to be deduplicated on the network shared storage device, deduplicate the data, store the deduplicated data on the first storage device, and replace the data in the network shared storage device by at least one indicator of the location of the deduplicated data in the first storage device. The indicator may be a pointer. The data may be in a data file, which may be replaced by a stub file containing the at least one indicator. The deduplication appliance may be configured to mount the first storage device in accordance with at least one rule established by the client machine.

The deduplication appliance may be further configured to provide a program to a client machine configured to, in response to a request from a client to copy data from a first location to a second location on the client machine, determine whether a source and a destination of the data to be copied is on the deduplication appliance, and provide at least one second indicator to the location of the deduplicated data in the second storage device at the second location, if the source and destination of the data are on the deduplication appliance. The at least one second indicator may be contained in at least one stub file, and program may be configured to create at least one second stub file in the second location containing the at least one second indicator. The program may comprise an agent program, a plug-in module, or a kernel on the client machine.

In accordance with a second embodiment of the invention, a functionality is implemented on a client system to manage requests to copy files of deduplicated data stored on a deduplication appliance, where the destination location is also on the deduplication appliance, without moving or copying actual data. Such copying is commonly used in data management operations, for example. In one example, when it is desired to copy a data file that has been deduplicated and is now represented by a stub file in a first location, a command, referred to herein as "dcopy," may be implemented to create on the client an additional stub file containing an indicator to the location of the data on the deduplication appliance's storage, at the desired second location. This eliminates the need to actually copy the data and provide the data to the client. Time, network bandwidth, and CPU usage in both the client and deduplication appliance are thereby saved.

In accordance with an example of the second embodiment of the invention, a method of copying deduplicated data stored by a deduplication appliance id disclosed, comprising receiving a request to copy data from a first location to a second location, by the client machine, determining whether the data at the first location has a source on a deduplication appliance, by determining whether the first location includes an indicator to a third location on the deduplication appliance where the data is stored. The method further comprises determining that the second location has a destination on the deduplication appliance and providing at least one second indicator to the third location on the deduplication appliance, at the second location, if the source and the destination are on the deduplication appliance. The request to copy data may comprise a request to copy a data file and the method may further comprise providing at least one second stub file containing at least one second indicator to the second location, if the source and the destination are on the deduplication appliance, such as by copying the at least one first stub file to the second location.

The data may be provided to the deduplication appliance by the client machine, via a network. The first and second locations may be on network shared storage of the deduplication appliance. Alternatively, the client may include network shared storage accessible by the deduplication appliance via a network, and the first and second locations may be in the network shared. The method may be implemented by an agent program, a plug-in module, or a kernel on the client machine.

In accordance with another embodiment related to the second embodiment, a system for copying data deduplicated by a deduplication appliance is disclosed comprising at least one first storage device and a processor configured to receive a request to copy data from a first location to a second location on the at least one first storage device. The processor is further configured to determine whether the data at the first location has a source on a deduplication appliance, by determining whether the first location includes an indicator to a third location on the deduplication appliance. The processor is further configured to determine whether second location has a destination on the deduplication appliance and provide at least one second indicator to the third location if the source and the destination are on the deduplication appliance. The request for the data may comprise a request for a data file and the processor may be configured to copy the at least one first stub file to the second location, if the source and the destination are on the deduplication appliance.

The processor may be configured to provide data to be deduplicated to the deduplication appliance, via a network, and the first and second locations may be in network shared storage of the deduplication appliance. Alternatively, the client machine may include network shared storage accessible by the deduplication appliance over a network, and the first and second locations are in the network shared storage. The processor may be controlled by an agent program, a plug-in module, or a kernel.

In accordance with another example of the second embodiment, a deduplication appliance is disclosed comprising storage to store deduplicated data and a processor configured to provide to a client machine software configured to monitor for a request to copy data from a first location to a second location on the client machine. The software is further configured to determine whether the data at the first location has a source on the deduplication appliance, by determining whether the first location includes an indicator a third location of the data on the deduplication appliance. The software is further configured to determine whether second location has a destination on the deduplication appliance and provide at least one second indicator to the third location if the source and the destination are on the deduplication appliance.

DETAILED DESCRIPTION OF THE PREFERRED EMBODIMENTS

Figure 1:
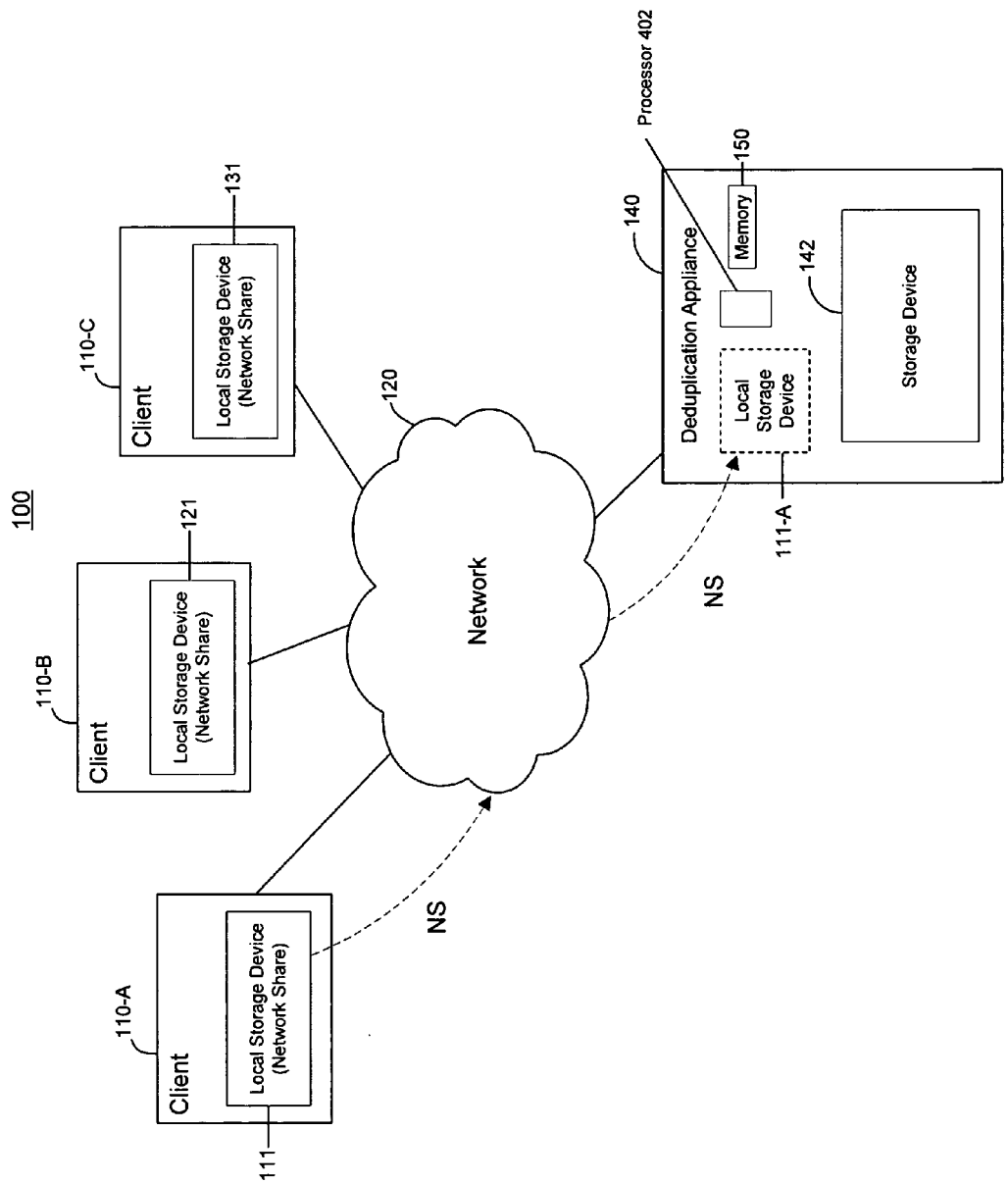
FIG. 1 is a block diagram of an example of a system for conducting deduplication by a deduplication appliance, in accordance with an embodiment of the invention.

FIG. 1 is a block diagram of an example of a system 100 in which deduplication may be conducted by a deduplication appliance 140, in accordance with an embodiment of the invention. The system 100 comprises one or more clients 110-A, 110-B, and 110-C, a network 120, and deduplication appliance 140. While in the example shown in FIG. 1 the system 100 comprises three clients 110-A, 110-B, and 110-C, more or fewer clients may be included.

Each of the clients 110-A, 110-B, and 110-C may comprise hardware, software, or a combination of hardware and software. In one example, each of the clients 110-A, 110-B, and 110-C comprises one or more computers or other devices, such as one or more personal computers (PCs) servers, or workstations. Alternatively, one or more of the clients 110-A, 110-B, and 110-C may comprise a software application residing on a computer or other device.

To store data locally, the client machines 110-A, 110-B, and 110-C may also include local storage devices 111, 121, and 131, respectively. The storage devices 111, 121, and 131, or parts of any or all of those storage devices, are designated as network share storage devices by the respective client devices 110-A, 110-B, and 110-C, as discussed further, below. Storage devices 111, 121, and 131 may comprise any device that is capable of storing data, such as disk drives, tape drives, flash drives, and/or optical disks, etc. Alternatively, each of the clients 110-A, 110-B, and 110-C may have access to a respective external storage device to store data and may also be designated network share storage devices. Each of the client machines 110-A, 110-B, and 110-C manages data that is generated and/or stored locally.

The network 120 may comprise any one or more of a number of different types of networks. In one example, communications are conducted over the network 120 by means of IP protocols. In another example, communications may be conducted over the network 120 by means of Fiber Channel protocols. Thus, the network 120 may be, for example, an intranet, a local area network (LAN), a wide area network (WAN), Fiber Channel storage area network (SAN), Ethernet, or the Internet.

In FIG. 1, the deduplication appliance 140 comprises a processor 402, memory 150, and a storage device 142. The storage device 142 may comprise any device that is capable of storing data, such as a disk drive, tape drive, flash drive, and/or optical disk, etc. Alternatively, the deduplication appliance 140 may use an external storage device or a storage device accessible over the network 120. The processor 402 may comprise hardware, software, or a combination of hardware and software. The processor 402 may be a suitably programmed computer processor, for example. Local storage device 111-A, shown in phantom, represents access to the network shared local storage device 111-A in the client 110-A, mentioned above. An example of a deduplication appliance is shown in more detail in FIG. 4.

In accordance with a first embodiment of the invention, the deduplication appliance 140 accesses data located on the local storage devices 111, 121, and 131 via the network 120, deduplicates the data, and stores the deduplicated data in the storage device 142. To enable access to the data on the local storage devices 111, 121, and 131, the deduplication appliance 140 mounts the network share local storage devices 111, 121, and 131 or a portion thereof. Mounting the network share local storage devices 111, 121, and 131 provides access to the data on the local storage device, as if the local storage device were present in the deduplication appliance or directly connected to it. This is shown schematically in FIG. 1, where a storage device 111-A corresponding to the local storage device 111 of the client machine 110-A is shown in phantom in the deduplication appliance 140. While FIG. 1 shows the entire local storage device 111 as a network share, only a portion of the local storage device may be designated as a network share and would be mountable by the deduplication appliance 140. Broken arrows NS from the client 110-A to the deduplication appliance 140, through the network 120, schematically represent the access to the data on the local storage device 111 by the deduplication appliance.

The data in the files on the client machines 110-A, 110-B, 110-C is replaced with indicators to the locations of the deduplicated data files on the storage device 142, by the deduplication appliance 140 via the network share, changing the data files to stub files. The original appearance of the data (directory and file structure) on the client machines 110-A, 110-B, 110-C is thereby preserved. Storage requirements are reduced and available storage space is increased on the local storage device 111 of the client machines 110-A, 110-B, 110-C. The indicators may be pointers, for example. If a client machine 110-A, 110-B, or 110-C uses a Unix operating system, the pointers may be symbolic file links.

Deduplication functionality may be performed by any technique known in the art. In one example, the data is deduplicated by dividing the data into data blocks, or segments of data, and processing the data blocks. The deduplication appliance 140 reads each data block, and computes a message digest or digital fingerprint, such as a hash value, of each data block, without transferring the data block to the deduplication appliance. Message digests are smaller than the original respective data blocks and uniquely represent each data block. The computation of hash values for data blocks is discussed in U.S. Pat. No. 7,055,008, U.S. Patent Application Publication No. 2007/0198659, and U.S. Pat. No. 7,962,499, which are assigned to the assignee of the present invention and are incorporated by reference herein in their entireties. The resulting hash value is compared to hash values of data blocks already stored on the storage device 142.

The hash values may be stored in a database of hash values by the deduplication appliance 140. The database may be in the storage device 142, the memory 150, or other memory, in the form of a table, for example. The table may correlate hash values, the location on the client machine 110-A where the corresponding data block came from, and the location on the deduplication appliance 140 where the data block is stored, such as the storage location on the storage device 142. If the data block is found to be unique (the hash value is not already stored in the table), the data block is copied from the storage location on the client machine 110-A and stored on the storage device 142, for example. The hash value of the data block is added to the table, with an indicator, such as a pointer, to the location of the actual data block in the storage of the deduplication appliance 140. The prior location of the data block on the client machine 110-A may also be included in the table.

If hash values of data blocks or data block portions match hash values in the table, then an identical data block or data block portion is not unique and has already been stored by the deduplication appliance 140. Another copy of the data block need not be transferred to the deduplication appliance 140 and stored, saving network bandwidth. In this case, the table may be updated to include the location on the client machine 110-A, for example, where the duplicate data blocks/data block portions is located, and the data on the client is replaced by a pointer to the already stored duplicate data block on the deduplication appliance 140.

The size of each data block may be fixed or variable, depending on the operating system or the system administrator's preferences. Fixed blocks are easier to manage, but may waste space. Variable blocks make a better use of the available backup space, but are somewhat more difficult to keep track of. In addition, the size of the blocks may vary from file to file. For instance, one option may be to have each file contain a set number of blocks, N—the size of each block from a larger file of size S1 would be S1/N and the size of each block from a smaller file of size S2 would be S2/N, where S1/N>S2/N. A special case of a variable-sized block is the whole file itself (where N=1, for example), however, it is likely more advantageous to have smaller-sized blocks in order to avoid having to save large files that change only slightly between backups. In addition, the size of the blocks may be limited by the requirements of the specific algorithm used to create the message digest.

Hash values are generated by substantially collision free algorithms which generate a probabilistically unique hash value based on inputted data. Examples of substantially collision free algorithms are the SHA-1 algorithm and the MD5 (message digest 5) algorithm. Either may be used, for example, as described in U.S. Pat. No. 7,055,008 and U.S. Patent Application Publication No. 2006/0218638, which are assigned to the assignee of the present invention and are incorporated herein by reference in their entireties. U.S. Patent Application Publication No. 2006/0218638, which is also assigned to the assignee of the present invention and is incorporated by reference herein, describes other techniques that may also be used.

Figure 2:
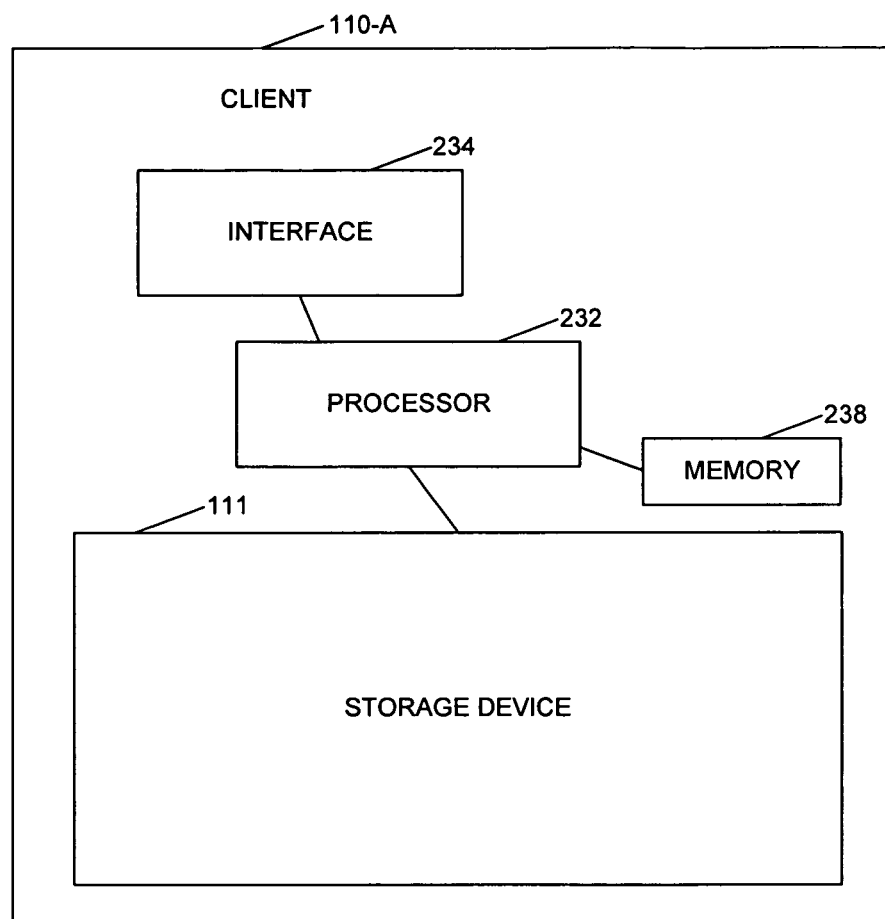
FIG. 2 is a block diagram of an example of a client machine, in the system of FIG. 1.

FIG. 2 is a block diagram of an example of the client machine 110-A. The client machine 110-A in this example comprises a processor 232, an interface 234, a memory 238, and the local storage device 111. The processor 232 controls the operations of the client computer 110-A, including retrieving data located on the storage device 142 of the deduplication appliance 140 when requested by a user. The memory 238 may comprise random-access memory (RAM). In one example, the memory 238 is used by the processor 232 to store data on a short-term basis, as is known in the art. The interface 234 provides a communication gateway through which data may be transmitted between the processor 232 and the network 120. The interface 234 may comprise any one or more of a number of different mechanisms, such as one or more SCSI cards, enterprise systems connection cards, fiber channel interfaces, modems, or network interfaces, for example.

The client 110-A may store data locally in the local storage device 111, for example. The processor 232 and the storage device 111 may be coupled through one or more additional interface devices (not shown). Data may be stored in the storage device 111 in the form of data files, which may in turn be organized and grouped into folders. A folder is sometimes referred to as a "directory," and a directory within another directory is sometimes referred to as a "sub-directory." Alternatively, data may be stored using other data structures.

Figure 3:
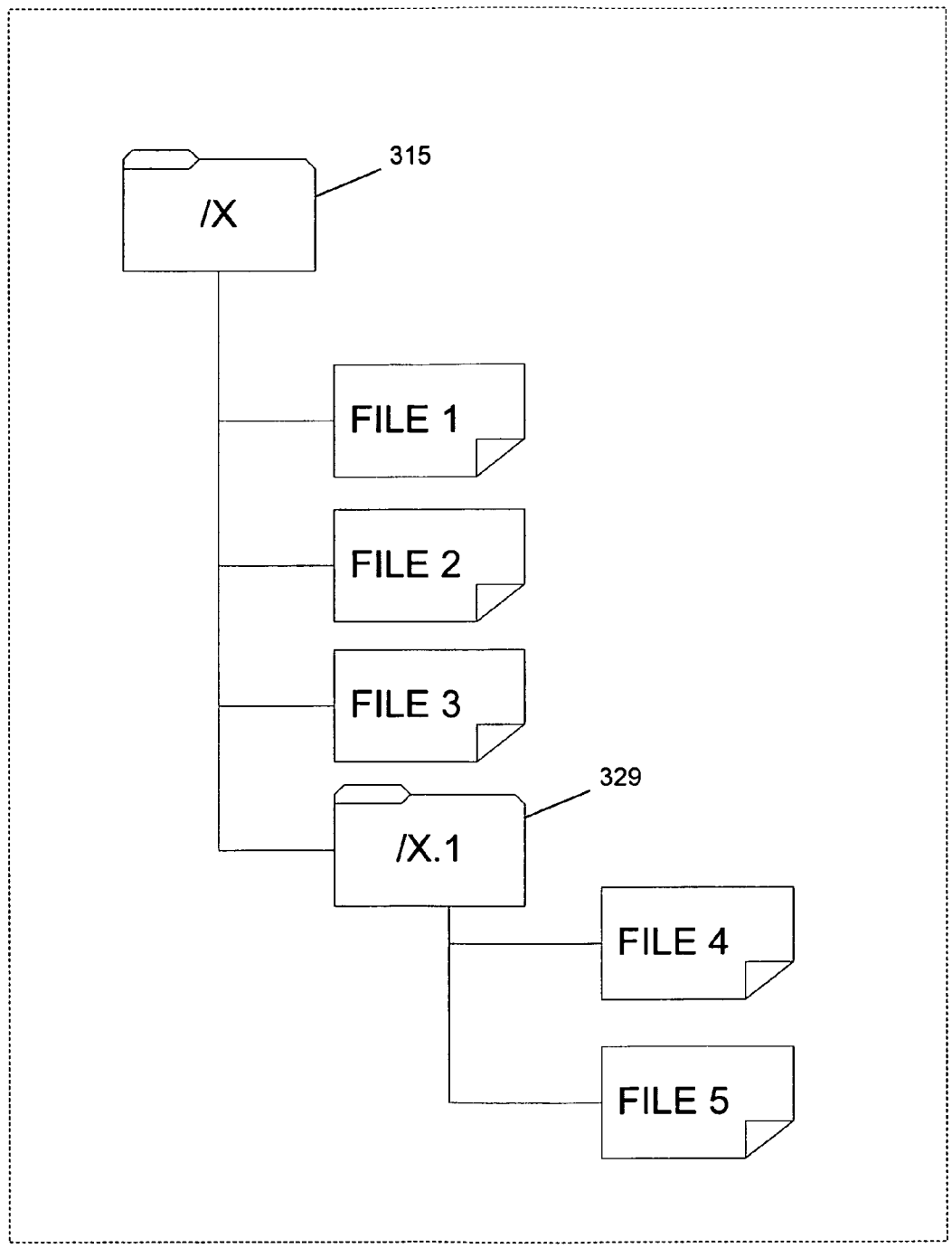
FIG. 3 is an example of a hierarchy structure of a directory including folders and files.

Storing data in the form of data files and folders, and maintaining directories to facilitate access to such files and folders, are well-known techniques. In FIG. 3, the folder 315 is defined by the directory path "/X" and comprises FILE 1, FILE 2, and FILE 3. Folder 315 also contains within itself another folder or subfolder, defined by the directory path "/X.1" (329), which in turn contains FILE 4 and FILE 5. Accordingly, each file is associated with a unique storage address specified in part by its directory path. It should be noted that the various data files stored in a folder (e.g., FILES 1, 2, 3, etc.) may be stored collectively on a single storage device, such as a single disk drive, or alternatively may be stored collectively on multiple storage devices, such as FILE 1 on a first disk drive, FILE 2 on a second disk drive, etc.

Figure 4:
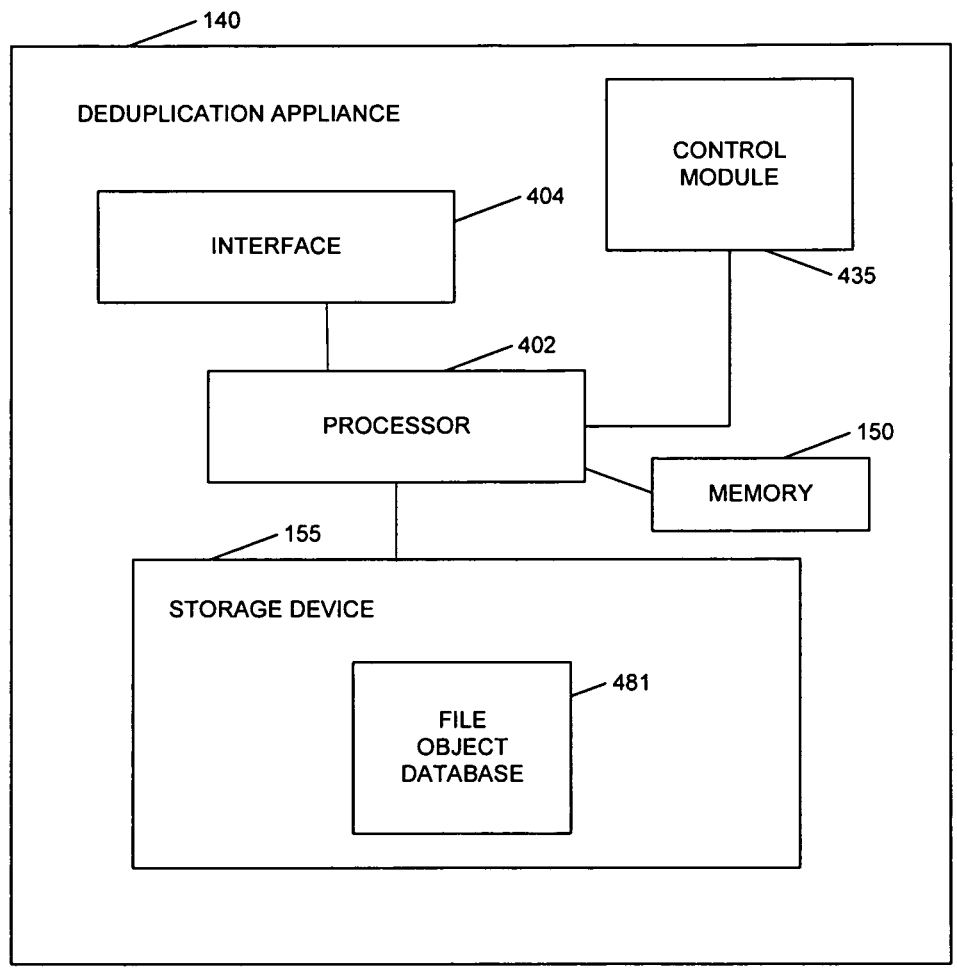
FIG. 4 is a more detailed block diagram of an exemplary deduplication appliance that may implement embodiments of the invention.

FIG. 4 is a more detailed block diagram of an exemplary deduplication appliance 140 that may implement embodiments of the invention. The deduplication device 140 comprises a processor 402, an interface 404, the memory 150, the storage device 142, and a control module 435. The processor 402 controls the operations of the deduplication device 140, including storing and accessing deduplicated data from the storage device 142, storing data in, and accessing data from, the memory 150, and causing data to be accessed and transmitted upon request to the client machines 110-A, 110-C, and 110-C. The control module 435 directs the access and deduplication of data from the client machines 110-A, 110-B, and 110-C. The memory 150 may comprise random-access memory (RAM), for example. The memory 150 may be used by the processor 402 to store data on a short-term basis. The interface 404 provides a communication gateway through which data may be transmitted between the processor 402 and the network 120. The interface 404 may comprise any one or more of a number of different mechanisms, such as one or more SCSI cards, enterprise systems connection cards, fiber channel interfaces, modems, or network interfaces. In this example, the deduplication appliance 140 comprises a computer, such as an Intel processor-based personal computer.

The storage device 142 may comprise one or more disk drives, or any appropriate device capable of storing data, such as tape drives, flash drives, optical disks, etc. The storage device 142 may perform data storage operations at a block-level or at a file-level. The processor 402 and the storage device 142 may be connected by one or more additional interface devices. In an alternative example, the storage device 142 may comprise a storage system separate from the deduplication appliance 140. In this case, the storage device 142 may comprise one or more disk drives, tape drives, flash drives, optical disks, etc., and may also comprise an intelligent component, including, for example, a processor, a storage management software application, etc.

The control module 435 may direct the access of data from the storage device 111 (in client machine 110-A) and cause the data to be deduplicated and stored in the storage device 142 in accordance with a schedule and/or other rules established by the respective client machines 110-A, 110-B, 110-C. To facilitate the storage of the deduplicated data blocks, the control module 435 may maintain one or more databases in the storage device 142. For example, the control module 435 may create and maintain a file object database 481 in the storage device 142. The file object database 481 may be maintained in the form of a file directory structure containing files and folders containing pointers to the locations of the data blocks in each file in the hash table. In addition, the file object database 481 may comprise a relational database or any other appropriate data structure. The directories, files, and folders may be based on the corresponding directories, files, and folders containing the deduplicated data on the client machine 110-A. The control module 435 may comprise software running on the processor 402, hardware, or a combination of software and hardware.

Mounting a storage device by a remote processor via a network is known in the art. A deduplication appliance 140 running Windows® operating system software, for example, may mount all or a portion of the storage device 111 to gain access to the client's network share by using the "mapping a drive" functionality built in to Windows®. If the deduplication appliance uses a Linux operating system, then the "mount" command may be used. The deduplication appliance 140 is then able to view and traverse the directory structure of the desired portion of the storage device 111, such as a directory structure shown in FIG. 3, and access files contained on the storage device 111 as if the files were stored locally on the deduplication appliance 140. The client 110-A may use any operating system capable of allowing access to its files over a network (file-sharing). The deduplication appliance 140 may then access a data set comprising a single file, multiple files, an entire folder, or multiple folders located on the local storage device 111. It is not necessary to actually move the data by an external data mover, as in prior art deduplication systems. Network protocols include NSF and CIFS, for example.

The deduplication appliance 140 may cause data to be backed up in accordance with one or more backup policies established by the respective client machines 110-A, 110-B, 110-C, for example. The backup policies may specify parameters including the storage device, directory, or file to be backed up; the backup time; and/or the backup frequency, etc. To enable a user to establish such backup policies, an agent may be provided by the deduplication appliance 140 for operation on the client, for example. The agent may generate a graphical user interface ("GUI") for use by each of the clients 110-A, 110-B, 110-C to facilitate the initial setup and selection of parameters for the backup policy, and to transmit the policy to the deduplication appliance 140. The deduplication appliance 140 may further coordinate the prioritization, scheduling, and other aspects of one or more clients' respective backup policies. This enables efficient use of the resources of the deduplication appliance 140.

By way of example, the user may invoke Windows Explorer® to examine various folders and files stored in the storage device 111 on the client 110-A. To backup the contents of FILE 1 in folder 315, for example, the user uses a computer mouse to select FILE 1 on the screen, and then "right-clicks" the computer mouse to select a desired option. In response, the deduplication appliance 140 causes a GUI to appear on the screen and allows the user to specify or edit a backup policy.

After the user selects a data set (files, folders, etc.) to be backed up and establishes one or more policies for backing up the selected data set, the deduplication appliance 140 backs up the data set in accordance with the specified policies. For example, the user of client 110-A may specify that FILE 1 is to be backed up daily at 10:00 AM. The control module 435 of the deduplication appliance 140 may monitor an internal clock (not shown) and, based on the user's specified parameters, cause deduplication of the data in FILE 1 when the clock indicates that the time is 10:00 AM. Referring to FIG. 3, in other examples, the client machine 110-A may establish the rule that the entirety of directory /X will be deduplicated, or only directory /X.1 will be deduplicated. In another example, the client machine 110-A may establish a rule that the entire directory be deduplicated once a day at midnight, while the directory /X.1 is also deduplicated at 6:00 AM. Once the backup policy is set, no further intervention by the client 110-A is required for the deduplication policy to be implemented by the deduplication appliance 140, unless the client wants to change the policy.

Figure 5:
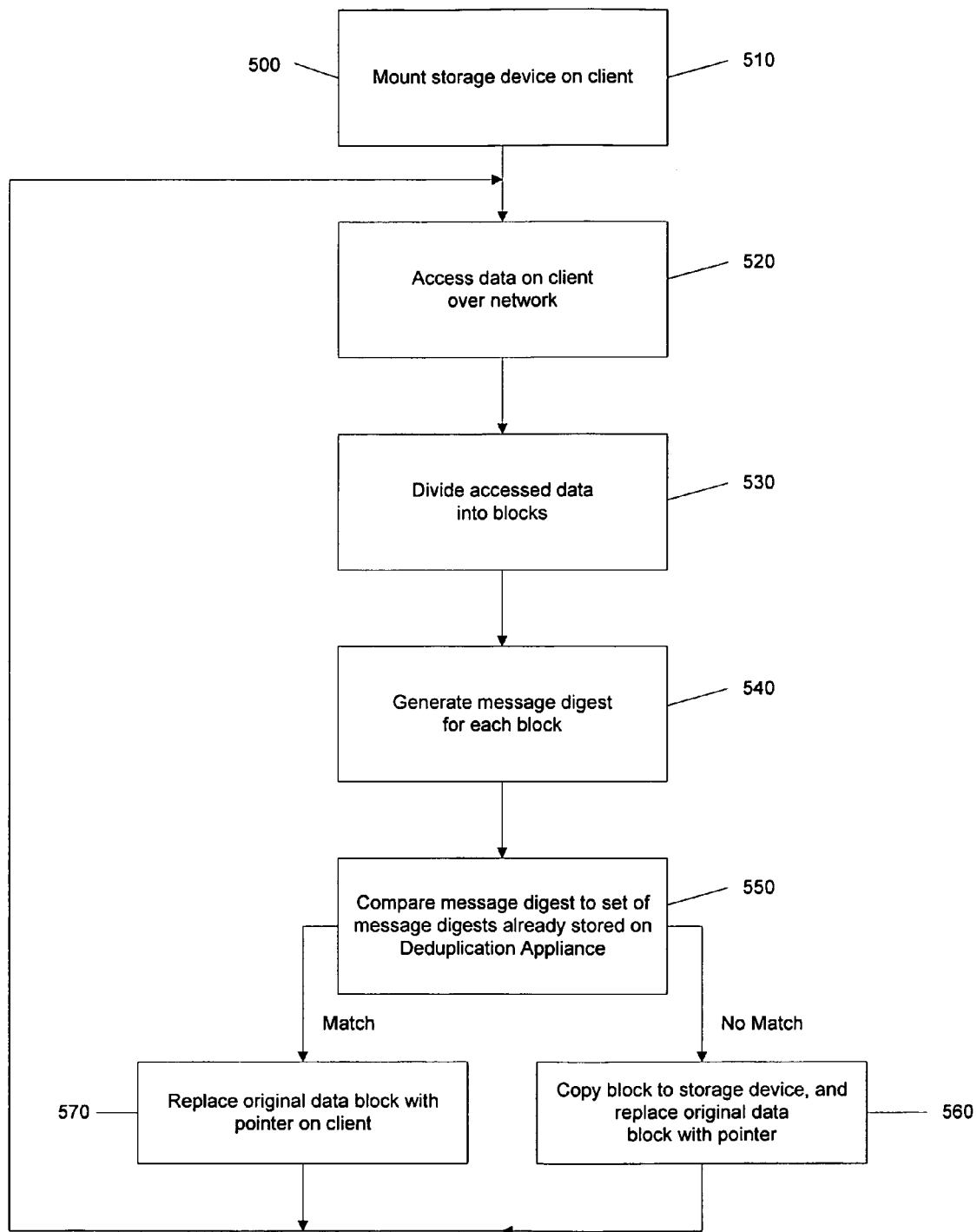
FIG. 5 is a flowchart of an example of a deduplication routine to backup a data set, in accordance with an embodiment of the invention.

FIG. 5 is a flowchart 500 of an example of a routine to deduplicate a data set, in accordance with an embodiment of the invention, where the deduplication appliance 140 is used at least in part as backup storage and where a backup/deduplication policy has been established, as described above. At a time established by the deduplication policy, the processor 402 of the deduplication appliance 140 is triggered by the control module 435 to mount the data set on the local storage device 111-A to be deduplicated, using the local storage device 111 as a network share, in step 510. The processor 402 accesses the data in the file for files subject to deduplication on the local storage device 111, in step 520. The processor 402 divides the data in each file into blocks of a predetermined size by the control module 435 using the memory 150, for example, in step 530. The processor 402 generates a message digest for each data block by use of a suitable hash function, for example, in step 540. Each message digest is matched against a set of message digests already stored in the storage device 142 of the deduplication appliance 140, in a hash table, for example, in step 550. Alternatively, other steps to accomplish any deduplication technique known in the art, may be applied in conjunction with embodiments of the present invention, as discussed above.

If no matching message digest for a data block is found, the processor 402 copies the data block to the storage device 142, and stores the message digest of that data block in the message digest table with a pointer to the location of the data block in the storage device 142. The processor 402 also replaces the data block in the file on the client machine 110-A, for example, by an indicator to the location on the storage device 142, changing the original data file to a stub file, in step 570. The original location of the data block on the local storage device 111 may also be stored in the message digest table or other location.

If the message digest already exists in the storage device 142, then a duplicate of that data block has already been backed up. The data block may be removed from the local storage 111 on the client and replaced by a pointer to the location of the already stored data block by the processor 402, in step 560. The message digest table may also be updated to refer to the second, duplicate location of the data block in the local storage device 111.

The process may be repeated starting at step 520, if there is additional data to deduplicate in the network shared storage of the client machine 110-A. The process may also be repeated starting at step 510 the next time deduplication is to be commenced, in accordance with the backup policy.

Dcopy Functionality

As discussed above, in accordance with another embodiment of the present invention, copying data from a first location to a second location on a client machine may be facilitated where the source of the data is on a deduplication appliance and the destination of the copy is also on the deduplication appliance. The source of the data is on the deduplication appliance if the data to be copied has been deduplicated and a stub file/indicator appears in the place of the data in the first location on the client machine. The destination of the data is also on the deduplication appliance if the second location is subject to deduplication. If the data is deduplicated in accordance with prior art techniques, where the data is sent to the deduplication appliance by a client machine for deduplication, the second location is a drive, storage device, or directory on the deduplication appliance. If the deduplication appliance deduplicates in accordance with the first embodiment of the invention, the second location is in a storage location that is part of the network share storage that is subject to deduplication by the deduplication appliance 140, as described above.

In accordance with this embodiment of the invention, when the source and location of the data are both on the deduplication appliance, instead of sending a copy of the requested data to the client machine, which would require sending a copy of the data from the deduplication appliance to the client machine across the network, an additional pointer or stub file is created on the client machine, indicating the location of the data on the deduplication appliance. The pointer or stub file corresponding to the file to be copied may be copied in the desired second location. This saves network bandwidth and storage on the client machine. A command, referred to herein as "dcopy," may be implemented to in effect copy the data files by creating additional stub files containing the symbolic links or pointers to the data on the deduplication appliance.

It can be determined whether the source of the data in the first location is on the deduplication appliance by whether the data in the first location has been deduplicated and an indicator or stub file containing an indicator is present in the first location, for example. If so, then the data/data file has been deduplicated and the data from the first location is stored on the deduplication appliance 140. It can be determined whether the destination of the data is on the deduplication appliance if the destination location is on the deduplication appliance. That will be the case if the first location is subject to deduplication, for example.

This functionality may be implemented by software on the client machine 110-A. The software may be an agent program designed to monitor copy requests on client systems, a plug-in module to interface with Windows Explorer®, or a kernel incorporated into the client's operating system, for example. The agent program and plug-in module may be provided by the deduplication appliance 140, for example.

A dcopy request may be invoked directly by a user on a client machine, such as the client machine 110-A, for example. A user on a client running the Windows® operating system may request a copy by a "right click" on a file or set of files, which may present an option to invoke dcopy. Application software, such as software performing file manipulation or data operations, may also invoke dcopy. If the client machine needs a copy of the actual data, it can be provided, as well. It should be noted that "dcopy" is merely an example of a command. Other command names and formats may be used.

Figure 6:
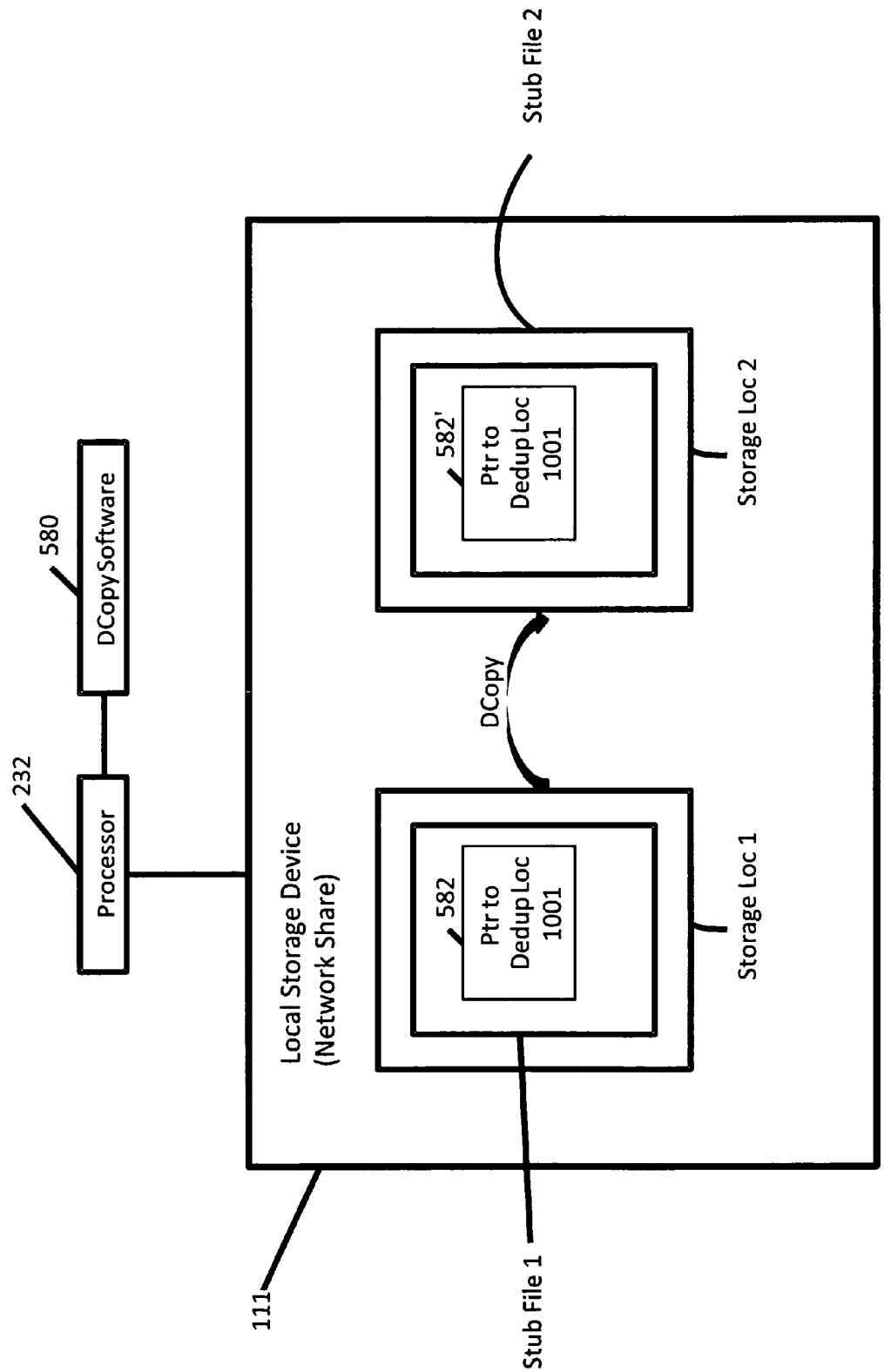
FIG. 6 is a schematic representation of an example of second embodiment of the invention, when used in the system of FIG. 1.

FIG. 6 is a schematic representation of dcopy functionality implemented by the processor 232 of the client machine 110-A, under the control of dcopy software 580, which in this example is an agent program downloaded by the client machine 110-A from the deduplication appliance 140, for example. Also in this example, the local storage device 111 is network share storage and data is deduplicated by the deduplication process of the first embodiment of the invention, where the deduplication appliance 141 mounts the network share of the client machine 110-A, as discussed above. FIG. 6 shows a first stub file 1 in storage location Loc 1. Stub file 1 includes a pointer 582 to a location on the storage device 142 of the deduplication appliance, at location 1001, for example. The stub file 1 is shown being copied to storage location Loc 2 in a dcopy process. The stub file 2 also contains a pointer 582' to the location 1001 on the storage device 142.

Figure 7:
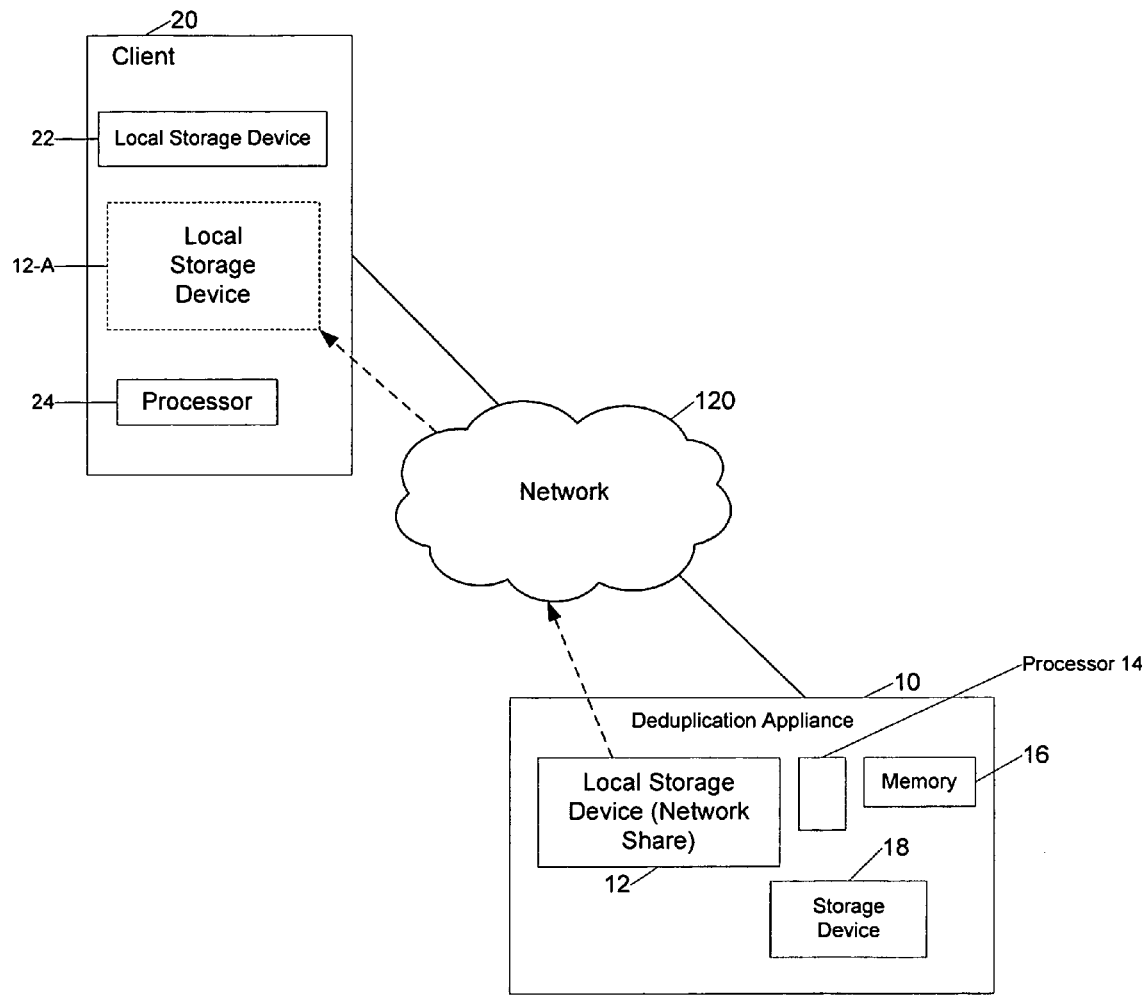
FIG. 7 is a block diagram of an example of a prior art system for conducting deduplication by a deduplication appliance.
Figure 8:
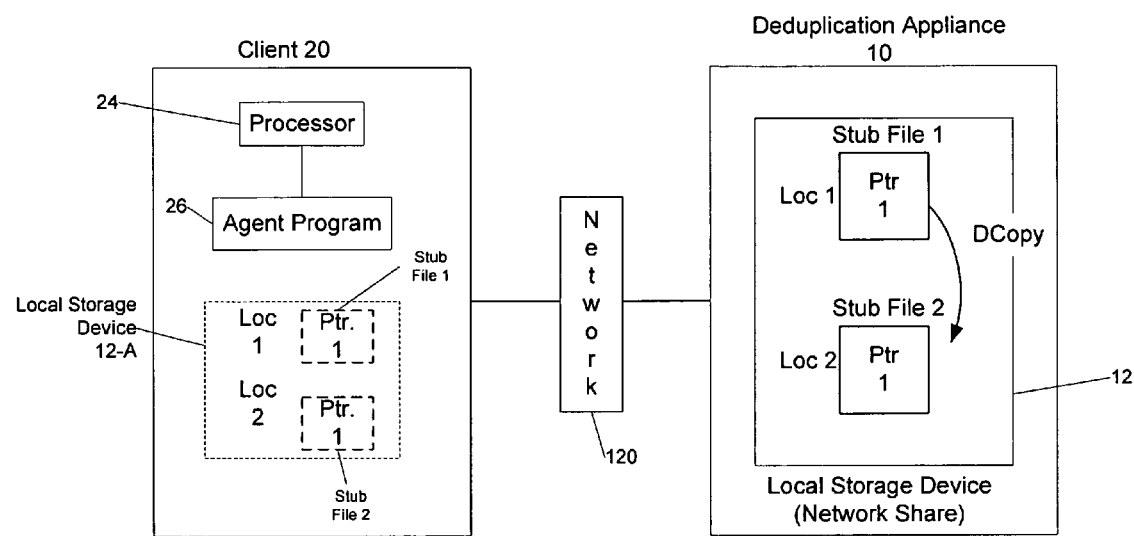
FIG. 8 is a schematic representation of a second embodiment of the invention when used in the system of FIG. 7.

It is noted that while in this example the local storage 111 is also network share storage, that is not required and the data in storage location Loc 1 may have been deduplicated by other techniques, as discussed above. FIG. 7 is an example of a prior art deduplication device 10 including a local storage device 12 that is a network share device, a processor 14, memory 16, and storage device 18. The client machine 20 has a local storage device 22. The client machine 20 has access to the network share storage device 12 of the deduplication appliance 10 across the network 120 by mounting the network share storage device 12. The network share storage device 12 is therefore indicated in phantom in the client machine 20 and identified as local storage device 12-A. The client machine 20 transfers the data/data files to be deduplicated to the deduplication appliance from the local storage device 22, for example. The processor 14 of the deduplication appliance 10 deduplicates the data as described above, for example, stores unique data blocks and corresponding message digests in a table on the storage device 18, and replaces the data or data files by indicators or stub files containing indicators to the location of the data blocks in the table. The stub files may be stored in the network share storage device 12, so that the client machine has access to them by mounting the network share storage device. FIG. 8 shows one such a stub file 1 in the network share storage device 12, in a location Loc 1. As in FIG. 1, the deduplication appliance 10 can deduplicate data from additional client machines (not shown), as well.

Dcopy functionality may be implemented by the client machine 20 in this example, as well. FIG. 8 is a schematic representation of the deduplication appliance 10, including the local storage device 12, which is a network share. A stub file 1 is provided at location (Loc) 1 of the local storage device 12, including a pointer Ptr 1 to a data block stored in the storage device 18, not shown in this view. The client machine 20, including the processor 24, and agent program 26 to implement dcopy functionality, and local storage device 12-A in phantom, are also shown. A stub file 1 in location Loc 1 is also shown in phantom in the local storage device 12-A. Since the local storage device 12 is a network share, when the client machine 20 mounts the local storage device, it has access to the stub file 1 as if it were stored on the client machine itself.

If the client machine 20 receives a request from a user or from a software application to copy the file corresponding to the stub file 1 from location 1 to a second location Loc 2, the processor 24 invokes dcopy, under the control of the agent program 26, to determine if the source and destination of the data file to be copied are on the deduplication appliance, as discussed above, and if so, copies the stub file 1 in the local storage device 12 of the deduplication appliance in the second location Loc 2, including the pointer Ptr 1, in the network share 12 of the deduplication appliance 10. The client machine 20 has access to the stub file 2 as if it were present on the client itself, as indicated by stub file 2 in the local storage device 12-A, in phantom. The client machine 20 may download an agent program or plug-in module, or kernel may be inserted into the client machine to implement the dcopy functionality in this example, as well.

Figure 9:
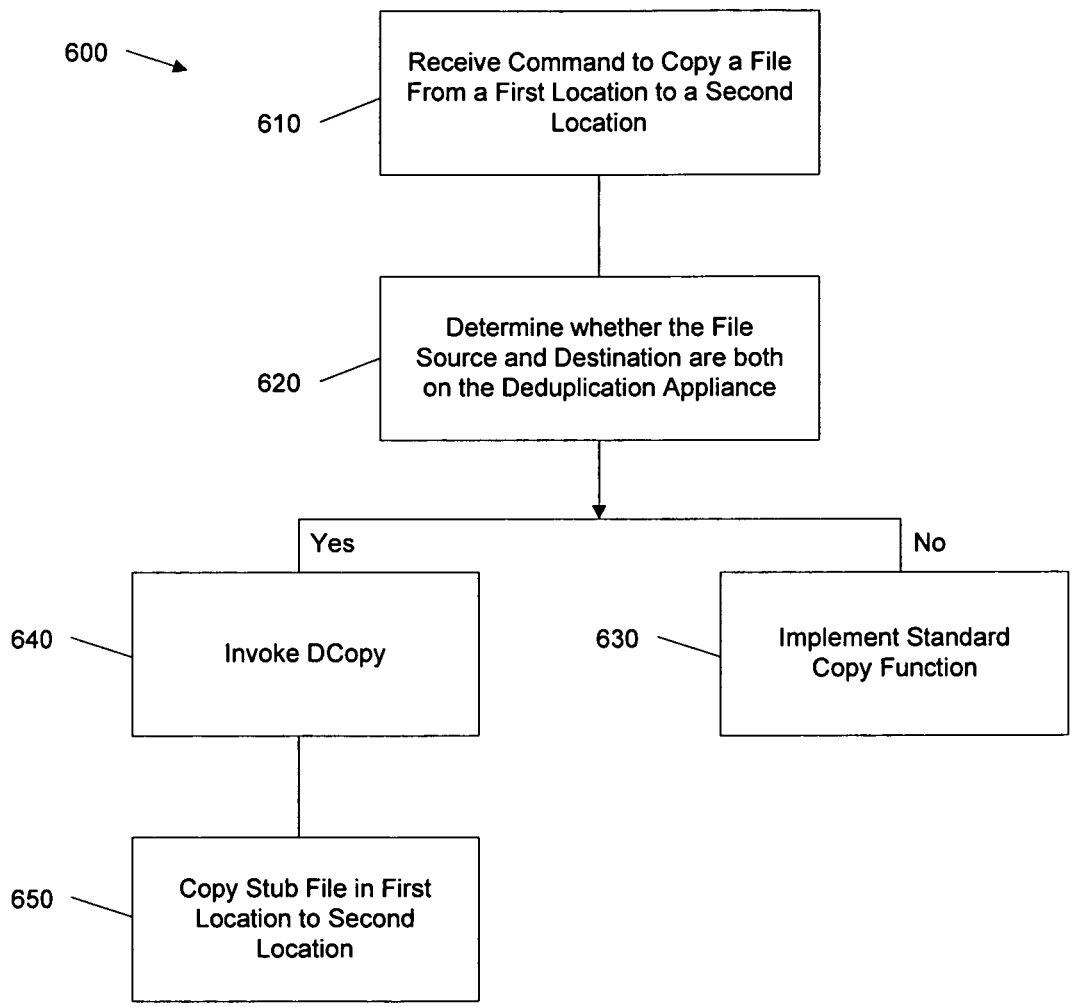
FIG. 9 is a flowchart of an example of a routine to copy deduplicated data, in accordance with a second embodiment of the invention.

FIG. 9 is an example of a routine 600 for implementing the second embodiment of the invention. A command to copy a file to a location is received by the processor 232 of the client machine 110-A from a user, in step 610. It is determined by the processor 232 whether the file to be copied has a source and destination in the deduplication appliance 140 by the processor 232, via the agent, plug-in module, or kernel, for example.

If it is determined that the file does have a source and destination on the deduplication appliance 140, then dcopy is invoked to copy the stub file in the first location containing the indicator or indicators to the location of the file to be copied on the deduplication appliance 140, to the second location, by the agent, plug-module, or kernel.

If the file source and location are not on the deduplication appliance 140, then standard copying is performed by the processor 232.

One of the ordinary skill in the art will recognize that other changes may be made to the embodiments described above without departing from the spirit and scope of the invention, which is defined by the claims below.

I claim:

1. A method of deduplicating data of a client device including dedicated local storage, by a deduplication device separated from the client device and the dedicated local storage of the client device by a network, the method comprising:
   mounting, by the deduplication device via the network, at least a portion of the dedicated local storage of the client machine to remotely access data to be deduplicated, the at least a portion of the dedicated local storage being designated as network shared storage by the client machine and the local storage being separate from the deduplication device;
   viewing a directory of the mounted network shared storage of the client machine to access files of data to be deduplicated, by the deduplication device;
   remotely accessing the identified data to be deduplicated on the mounted network shared storage of the client machine, across the network, by the deduplication device;
   deduplicating the accessed data on the mounted network shared storage of the client machine, by the deduplication device, without transferring the data to be deduplicated to the deduplication device;
   storing the deduplicated data on a storage device separated from the network shared storage by the network, by the deduplication device; and
   replacing the deduplicated data in the mounted network shared storage of the client machine by at least one indicator of the location of the deduplicated data in the storage device.

2. The method of claim 1, wherein accessing data comprises:
   accessing a data file to be deduplicated on the mounted network shared storage, by the deduplication device; and
   replacing the deduplicated data comprises:
   replacing the deduplicated data file by at least one stub file containing at least one indicator.

3. The method of claim 2, further comprising:
   receiving a request by the client machine from a user to copy a data file from a first location on the network shared storage to a second location on the network shared storage, wherein the data file comprises deduplicated data stored by the deduplication device; and
   providing at least one second stub file containing at least one indicator to the location of the deduplicated data in the storage device, if the source and destination of the data to be copied are the deduplication device, in response to the request.

4. The method of claim 3, comprising:
   providing the at least one second stub file by an agent program, a plug-in module, or a kernel on the client machine.

5. The method of claim 3, wherein:
   the at least one indicator comprises at least one pointer; and
   providing at least one second stub file at the second location comprises:
   copying the at least one first stub file including the at least one indicator to the second location to form the at least one second stub file.

6. The method of claim 1, wherein the at least one indicator comprises at least one pointer.

7. The method of claim 1, wherein the network comprises an intranet, a local area network, a wide area network, a fiber channel storage area network, an Ethernet, or the Internet.

8. The method of claim 1, wherein the network shared storage comprises at least a portion of a local storage device.

9. The method of claim 1 wherein the local storage is directly connected to or is part of the client machine.

10. The method of claim 1, further comprising:
    mounting at least a portion of the dedicated local storage of the client machine in accordance with at least one rule established by the client machine.

11. The method of claim 10, wherein the at least one rule further comprises: identification of the network shared storage of the client machine; the deduplication time; identification of the directories on the network shared storage; and/or identification of the files on the network shared storage to be deduplicated.

12. The method of claim 10, wherein the at least one rule comprises identification of fewer than all the directories to be deduplicated and/or identification of fewer than all of the files on the network shared storage to be deduplicated.

13. The method of claim 10, wherein the at least one rule comprises deduplication frequency.

14. The method of claim 10, further comprising:
    receiving the at least one rule via a graphical user interface.

15. The method of claim 14, further comprising providing an agent to the client machine to generate the graphical user interface.

16. The method of claim 1, wherein the client machine comprises a computer, a workstation, or a server.

17. The method of claim 16, wherein the client machine comprises a personal computer.

18. The method of claim 1, comprising copying deduplicated data across the network for storage in the storage device, if a message digest corresponding to the deduplicated data block is not already stored in the storage device.

19. A system for deduplicating data of a client device including dedicated local storage, the system comprising:
    a storage device; and
    a deduplication device separated from the client device and dedicated local storage of the client device by a network, and the storage device being separated from the client device by the network, the deduplication device comprising at least one processor configured to:
    mount, via a network, at least a portion of the dedicated local storage of the client machine to deduplicate data on the dedicated local storage, the at least a portion of the dedicated local storage being designated as network shared storage by the client machine, the local storage being separate from the deduplication device;

view a directory of the mounted network shared storage of the client machine to access files of data to be deduplicated, by the deduplication device;

remotely access the identified data to be deduplicated on the mounted network shared storage of the client machine;

deduplicate the accessed data on the mounted network shared storage of the client machine without transferring the data to be deduplicated to the deduplication device from the mounted network shared storage of the client machine, via the network;

store the deduplicated data on the storage device; and replace the deduplicated data in the mounted network shared storage of the client machine by at least one indicator of the location of the deduplicated data in the storage device.

20. The system of claim 19, wherein the deduplication device is configured to:

access a data file to be deduplicated on the mounted network shared storage of the client machine;

deduplicate the data in the accessed data file; and replace the deduplicated data file by at least one stub file containing the at least one indicator.

21. The system of claim 19, wherein the at least one indicator comprises at least one pointer.

22. The system of claim 19, wherein the deduplication device is further configured to:

provide a program to a client machine, the program configured to cause a processor of the client machine to:

in response to a request from a client to copy data from a first location to a second location on the client machine, determine whether a source and a destination of the data to be copied are on the deduplication device; and provide at least one second indicator to the location of the deduplicated data in the second storage device at the second location, if the source and destination of the data are on the deduplication appliance.

23. The system of claim 22, wherein the at least one second indicator is contained in at least one stub file, and the program is configured to cause the processor of the client machine to:

create at least one second stub file in the second location containing the at least one second indicator.

24. The system of claim 22, wherein the program comprises an agent program, a plug-in module, or a kernel on the client machine.

25. The system of claim 19, wherein the network comprises an intranet, a local area network, a wide area network, a fiber channel storage area network, an Ethernet, or the Internet.

26. The system of claim 19, wherein the network shared storage comprises at least a portion of a storage device of the client machine.

27. The system of claim 19, wherein the local storage is directly connected to or is part of the client machine.

28. The system of claim 19, wherein the at least one processing device is configured to mount the local storage in accordance with at least one rule established by the client machine.

29. The system of claim 28, wherein the at least one rule comprises: identification of the network shared storage of the client machine; the deduplication time; identification of the directories on the network stored storage to be deduplicated; and/or identification of the files on the network shared storage to be deduplicated.

30. The system of claim 28, wherein the at least one rule comprises identification of fewer than all the directories and/or files on the network shared storage to be deduplicated.

31. The system of claim 28, wherein the at least one rule comprises deduplication frequency.

32. The system of claim 28, wherein the at least one processing device is further configured to:

receive the at least one rule from the client machine.

33. The system of claim 32, wherein the at least one processor is further configured to provide an agent to the client machine to generate the graphical user interface.

* * * * *